(12) United States Patent
Geter et al.

(10) Patent No.: US 10,271,583 B2
(45) Date of Patent: Apr. 30, 2019

(54) BIB HAVING ADJUSTABLE SYSTEM

(71) Applicants: Carole Lynn Geter, Graniteville, SC (US); Latisha Mays, North Augusta, SC (US)

(72) Inventors: Carole Lynn Geter, Graniteville, SC (US); Latisha Mays, North Augusta, SC (US)

(*) Notice: Subject to any disclaimer, the term of this patent is extended or adjusted under 35 U.S.C. 154(b) by 153 days.

(21) Appl. No.: 15/447,224

(22) Filed: Mar. 2, 2017

(65) Prior Publication Data

US 2017/0251731 A1    Sep. 7, 2017

Related U.S. Application Data

(60) Provisional application No. 62/304,406, filed on Mar. 7, 2016.

(51) Int. Cl.
| | | |
|---|---|---|
| *A41B 13/10* | (2006.01) | |
| *A01K 13/00* | (2006.01) | |
| *A41D 13/04* | (2006.01) | |

(52) U.S. Cl.
CPC .......... *A41B 13/103* (2013.01); *A01K 13/006* (2013.01); *A41B 13/10* (2013.01); *A41D 13/046* (2013.01); *A41B 2300/32* (2013.01); *A41B 2300/326* (2013.01)

(58) Field of Classification Search
CPC .............. A41B 13/103; A41B 2300/32; A41B 2300/326; A41B 13/10; A01K 13/006; A41D 13/046
USPC ...... 2/53, 48, 206, 207, 50, 49.4, 49.2, 49.1, 2/46, 468
See application file for complete search history.

(56) References Cited

U.S. PATENT DOCUMENTS

| | | | | | |
|---|---|---|---|---|---|
| 4,536,889 | A * | 8/1985 | Taylor | ................ | A44C 5/0046 2/160 |
| 4,700,408 | A * | 10/1987 | Winger | ................ | F16M 13/04 24/3.13 |
| 4,735,423 | A * | 4/1988 | Foss | ........................ | B62B 15/00 2/2.5 |
| 5,661,851 | A * | 9/1997 | Sanchez | ................ | A41B 13/10 2/46 |
| 5,815,834 | A * | 10/1998 | Bronson | ................ | A41B 13/00 2/102 |
| 5,902,111 | A * | 5/1999 | Lindsey | ................ | B44D 2/002 434/81 |
| 6,000,056 | A * | 12/1999 | Brady | ................ | A41B 13/103 2/49.1 |

(Continued)

*Primary Examiner* — Katherine M Moran
*Assistant Examiner* — Dakota Marin
(74) *Attorney, Agent, or Firm* — F. Rhett Brockington

(57) ABSTRACT

A bib having a first layer of a filmic impermeable material on a front of the bib having a first body portion and upwardly extending flaps, a third layer of filmic impermeable material on a rear of the bib, where the first and third layers are joined at their perimeter edges, forming a shallow cavity. The bib has a neck ring. Below the neck ring, the shallow cavity has a top horizontal opening and a bottom horizontal opening in the first body portion. A second layer, which is an absorbent material, shaped into an adjustable loop, loops through the openings, the shallow cavity, and down the front of the bib. When the outer section of the loop becomes soiled, the soiled section can be rotated into the shallow cavity, simultaneously exposing an unsoiled section of the loop, providing a refreshed unsoiled outer section.

9 Claims, 3 Drawing Sheets

(56) References Cited

U.S. PATENT DOCUMENTS

| | | | | |
|---|---|---|---|---|
| 6,076,194 | A * | 6/2000 | Purkett | A41D 27/08 2/244 |
| 6,735,780 | B1 * | 5/2004 | Jaunault | A41D 13/043 2/48 |
| 6,742,189 | B2 | 6/2004 | Bennett | |
| 6,745,399 | B1 * | 6/2004 | Austin | A41B 13/103 2/49.1 |
| 7,032,247 | B2 * | 4/2006 | Frieswick | A41B 13/10 2/49.1 |
| 7,032,248 | B1 * | 4/2006 | Gutilla | A41B 13/10 2/49.1 |
| 8,740,870 | B2 | 6/2014 | Autran et al. | |
| 9,468,242 | B1 | 10/2016 | Lee | |
| 2003/0119399 | A1 * | 6/2003 | Shipp, Jr. | A61K 8/0208 442/327 |
| 2004/0205876 | A1 * | 10/2004 | Bruffett | A41B 13/103 2/49.2 |
| 2013/0125307 | A1 * | 5/2013 | Margalit | A47G 9/062 5/417 |

* cited by examiner

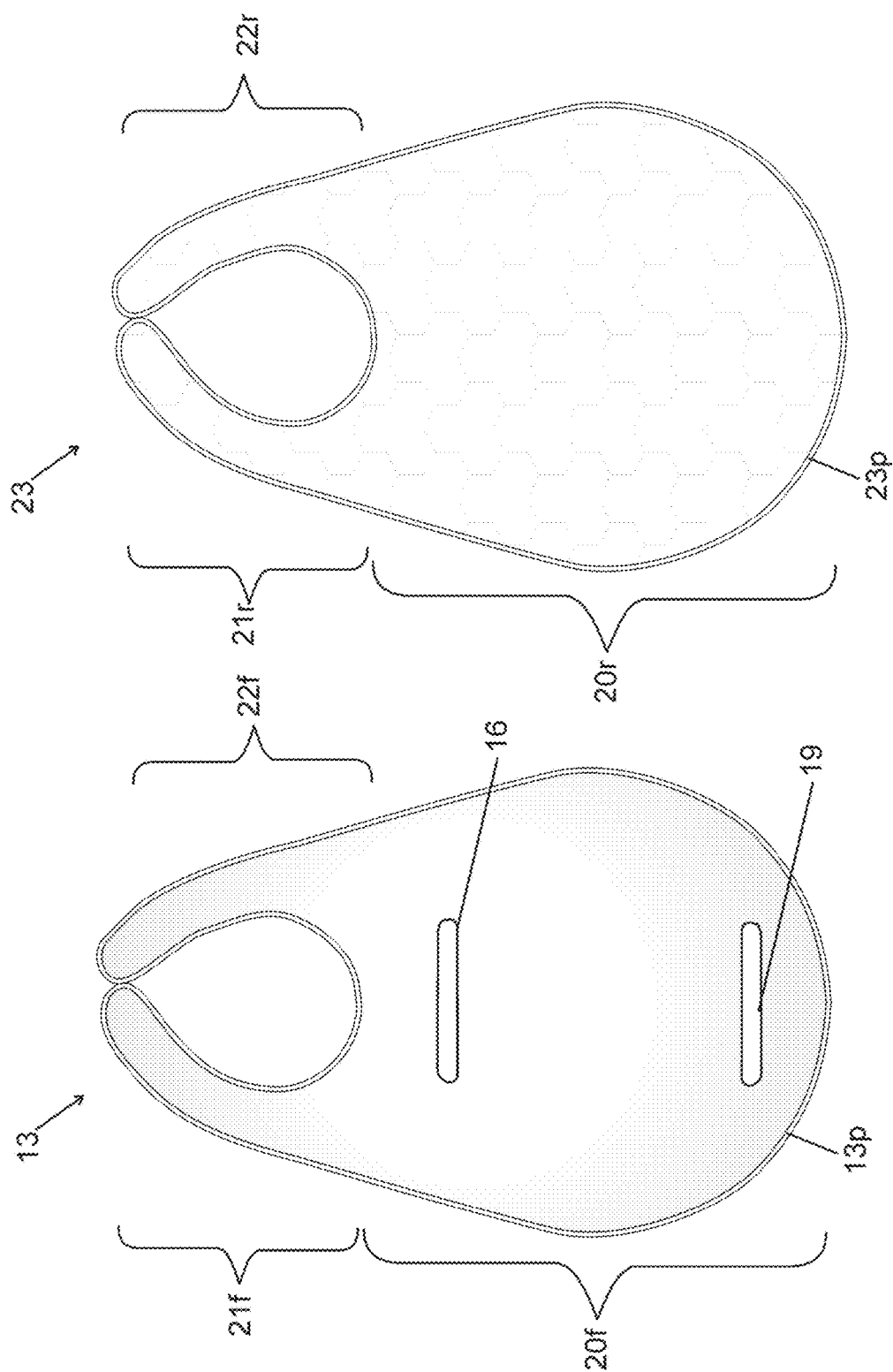

BIB HAVING ADJUSTABLE SYSTEM

CROSS-REFERENCES TO RELATED APPLICATIONS

The present patent application/patent claims the benefit of priority of U.S. Provisional Patent Application No. 62/304,406, filed on Mar. 7, 2016, and entitled "BIB HAVING ADJUSTABLE SYSTEM", the contents of which are incorporated in full by reference herein.

BACKGROUND OF THE INVENTION

1. Field of the Invention

The present invention is in the technical field of garment protectors. More particularly, the present invention is in the technical field of bibs. More particularly, the present invention is in the technical field of bibs with an adjustable system that absorbs liquids, for use by adults, children or pets.

2. Background

Conventional bibs are typically single layered garments that protect the wearer from clothing stains and moisture against the body or skin. Bib wearers can include adults in nursing homes, infants and toddlers, and anyone who drools regularly, particularly adults and children with special needs. With any of these bib wearers, it is common to have to change the bib up to 10-15 times a day because of both the food that drips on the bib and the constant drooling. Regular bib changes are necessary to keep the wearer clean and dry. Otherwise, the conventional bib, which lies flat against the wearer's clothing or body, will become saturated quickly and lose its ability to keep the wearer dry. Prolonged moisture on the chest can cause skin irritation, rashes, or illness. It can be difficult for caregivers who have to constantly change, wash, and replace bibs because of the limited usefulness that conventional bibs provide. In an attempt to address bib saturation, recent art describes multi-layer bibs with an absorbent top layer backed by a fluid impermeable layer, removable absorbent layers, and/or clothing attachments. Such bibs, while providing some level of absorption and temporarily protecting the wearer, still require constant changing, washing, and replacing.

Therefore, there is a long-felt need for a means for maintaining bib dryness for bib wearers.

Drooling pets can present similar problems. Pets that constantly drool can stain fur, furniture, clothing, and other items they come into contact with. Owners of pets that drool constantly must continuously use and wash towels or cloths to catch the drool, which easily become saturated. There is thus further a need to catch and absorb a pet's drool without constantly needing to replace and wash towels or cloths.

SUMMARY OF THE INVENTION

An aspect of the various embodiments is that the first layer may have designs, colors, and prints.

Another aspect of the various embodiments is that the absorbent material of the second layer can have designs, colors, and prints.

A second object of the present invention is that the bib wearer can be adopted to be suitable for a pet.

A third object of the invention is to protect items that the bib wearer may come into contact with, including clothing of a caregiver and other individuals, furniture, bedding, the floor, and in general proximate elements.

These and other objects and advantages of the present invention will be readily appreciable from the following description of preferred embodiments of the invention and from the accompanying drawings and claims.

BRIEF DESCRIPTION OF THE DRAWINGS

The foregoing invention will become readily apparent by referring to the following detailed description and the appended drawings in which:

FIG. 1a a frontal planar view of the first layer;

FIG. 1b a frontal planar view of the third layer; and

DETAILED DESCRIPTION OF THE INVENTION

Illustrative embodiments and exemplary applications will now be described with reference to the accompanying drawings to disclose the advantageous teachings of the present invention.

Various embodiments of the invention are described more fully hereinafter with reference to the accompanying drawings, in which some, but not all of the embodiments of the invention are shown in the figures. Indeed, these inventions may be embodied in many different forms and should not be construed as limited to the embodiments set forth herein; rather, these embodiments are provided so that this disclosure will satisfy applicable legal requirements. Those having ordinary skill in the art and access to the teachings provided herein will recognize additional modifications, applications, and embodiments within the scope thereof and additional fields in which the present invention would be of significant utility.

Figure 1:
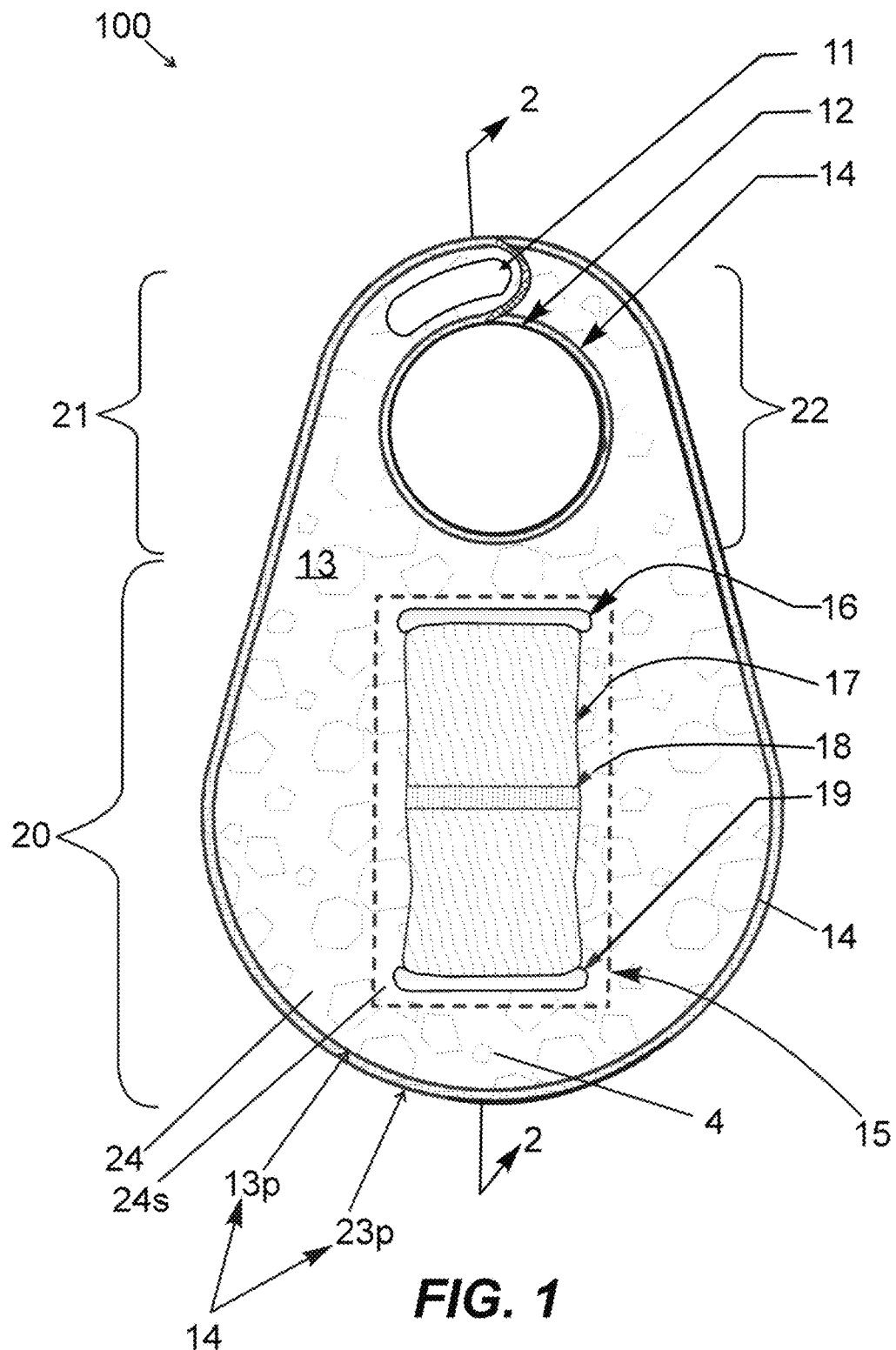
FIG. 1 is a frontal view of the invention, a bib having an adjustable system, wherein a bottom body portion of the bib includes a first layer of fluid impermeable material on a front of the bib, a third layer of fluid impermeable material on a back of the bib, and a loop of absorbent material that is a second layer, wherein the loop is adjustable such that it is partially exposed on the first layer and is partially covered by the first layer and the third layer.
Figure 2:
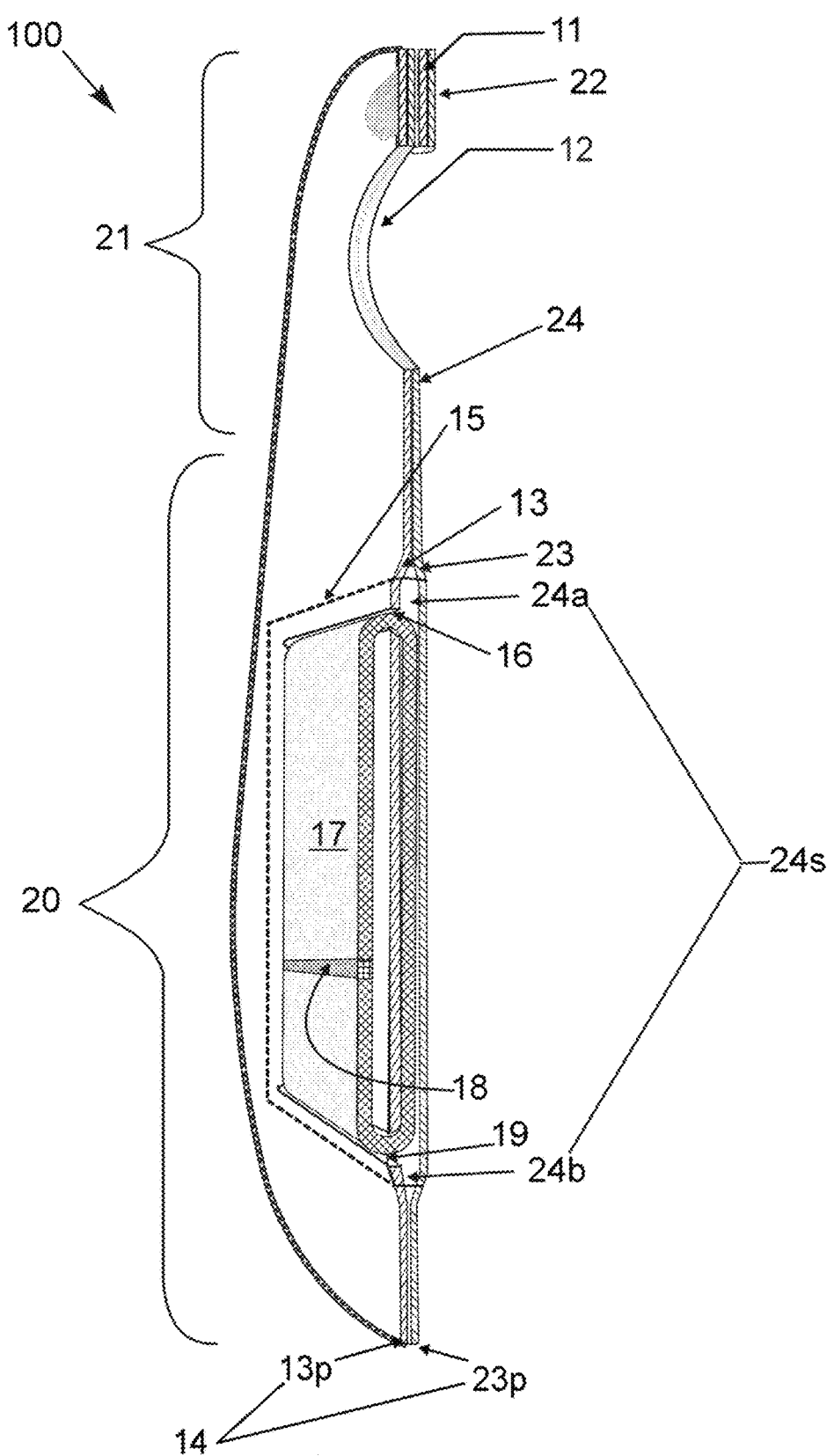
FIG. 2 is a cross-sectional view of the bib shown in FIG. 1 taken along sectional line 2-2 illustrating that the loop of absorbent material passes through two horizontally parallel elongate openings in the first layer into a deeper portion of the shallow cavity that is between the first layer and the third layer.

Referring now to the invention in more detail, in the frontal view of FIG. 1 there is a bib having an adjustable system 100, wherein an absorbent material is adjusted therein providing unsoiled absorbent material. FIG. 2 is a cross-sectional view taken along sectional line 2-2 of the bib shown in FIG. 1, and it illustrates that the absorbent material passes through two horizontally parallel elongate openings in the first layer into a shallow cavity that is between the first layer and the third layer.

The first layer 13 may be made of plastic, rubber, vinyl, or any impermeable flexible material as will be appreciated by those of ordinary skill in the art. The bib 100 includes a body portion 20 and two upwardly extending flap portions 21 and 22. The flap portions 21 and 22 are connected with the adjustable fastener 11 adapted to form a closed closeable neck ring 12 around the bib wearer's neck.

In more detail, still referring to the invention of FIG. 1, the first layer 13 may vary in shape and size. The first layer 13 may have any number of designs, colors, and prints.

A third layer 23 may vary in shape and size but is preferably about identical in size to the first layer 13. The first layer 13 and third layer 23 are preferably overlying and have joined perimeter edges 14 therein creating a shallow cavity 24. It is anticipated that other combinations and arrangements are possible.

As shown in FIG. 1, FIG. 1a, FIG. 1b and FIG. 2 the first layer 13 of the bib 100 is affixed to the third layer 23 by joining a front perimeter edge 13p of the first layer 13 to a rear perimeter edge 23p of the third layer 23 by stitching, heat sealing or adhesively adhering therein forming the perimeter 14 and the shallow cavity 24 within the joined perimeter edges of the first layer and the third layer. The third layer 23 may be made of plastic, rubber, vinyl, or any liquid impermeable material, as will be appreciated by those of ordinary skill in the art.

The body portion 20 of the bib 100 includes the front body portion 20f, front portion of right upwardly extending flap 21f, and front portion of left upwardly extending flap 22f of the first layer 13 as shown in FIG. 1a. The body portion 20 of the bib 100 also includes the rear body portion 20r, rear portion of right upwardly extending flap 21r, and rear portion of left upwardly extending flap 22r of the third layer 23 as shown in FIG. 1b. The top opening 16, as shown in FIG. 1, is proximate to the closeable neck ring 12, and the bottom opening 19, which is proximate to a lower end 4 of the bib 100, are typically horizontal, elongate and substantially medial, parallel openings through the front body portion of the first layer 13. The top opening 16 and bottom opening 19 are contained within a stitch line 15 that defines and reinforces a deeper portion 24s of the shallow cavity 24. Opposing ends of the second layer 17 are attached forming the loop by a fastening element 18, such as an adjustable fastener that is includes hook and loop strips.

FIG. 2 is a cross-sectional view of the invention. The second layer 17 is adjustable and rotatable through top opening 16 and bottom opening 19. The second layer 17 cycles through the deeper portion 24s between the first layer 13 and third layer 23. The deeper portion 24s extends lengthwise from 24a to 24b, as shown in FIG. 2. The absorbent material is selected from the group consisting of cotton, linen, terry cloth, or any absorbent material as will be appreciated by those of ordinary skill in the art. The absorbent material can preferably be cleaned by washing. In an alternate embodiment the absorbent material is disposable, and nominally is selected from absorbent products that frequently contain cellulosic absorbent materials. The absorbent products can include powders such as maltodextrin, corn starch, and acacia. These powders absorb oily liquids as well as watery liquids, but cannot be easily cleaned by washing.

As shown in the figures, second layer 17 is a continuous loop and may be substantially rectangular in shape, wherein opposing ends of the rectangular shaped second layer 17 are joined with a releasable fastening element 18 that when joined forms the continuous loop. The illustrated releasable fastening element 18 is a hook and loop strip. In the illustrated embodiment, the top opening 16 is placed proximate and below the neck ring 12, leaving little space between the top opening 16 and the neck ring 12.

The second layer 17 is adapted to substantially cover and/or protect the bib wearer from moisture caused by drooling, eating, or drinking.

The two horizontally parallel elongate openings in the first layer can be a top horizontal elongate eyelet adjoined to the top opening and a bottom horizontal elongate eyelet adjoined to the bottom opening, wherein the top and the bottom horizontal eyelets provide support for the first layer, and in particular provides support for the top opening and the bottom opening as the second layer is being adjusted.

The advantages of the present invention include, without limitation, protecting a bib wearer from moisture and oil against the body and stains to clothing and other items.

Broadly, the present invention is an absorbent bib with an adjustable system, wherein the system provides for periodically refreshing by rotating a clean dry section of the loop of the second layer from the deeper portion 24s to an outermost portion of the bib, wherein a soiled section of the second layer 17 is rotated behind the first layer into the deeper portion, where the soiled section is covered. Further adjustment includes replacing a partially or totally soiled second layer with a clean second layer, and refastening it. Replacing the bib 100 and adjusting the closed neck ring should be done at least on an as needed basis therein maintaining a clean comfortable environment. If the second layer is not going to be replaced, adjustment can typically be effected without removing the bib. Replacement is required less frequently as there is nearly twice as much absorbent material, and soiled absorbent material can be isolated in the sub-cavity 24s.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A bib with an adjustable system, wherein said bib comprises:

a first layer of a filmic fluid impermeable material on a front of the bib, the first layer having a front body portion and a left and a right upwardly extending front flap portions, wherein the first layer has a front perimeter edge;

a third layer of filmic fluid impermeable material on a rear of the bib, the third layer having a rear body portion and a left and a right upwardly extending rear flap portions, wherein the third layer has a rear perimeter edge;

wherein the front perimeter edge of the first layer and the rear perimeter edge of the third layer of the bib are joined forming a shallow cavity between the first layer and the third layer, and a closeable neck ring comprised of a left flap and a right flap;

a stitch line that extends from the front body portion to the rear body portion, where the stitch line geometrically defines and reinforces a deeper portion of the shallow cavity;

a top opening through the front body portion, said top opening positioned medially within the stitch line and proximate to the closeable neck ring, wherein said top opening is horizontal and elongate, therein providing access to the deeper portion of the shallow cavity, and a bottom opening through the front body portion, wherein said bottom opening is also horizontal, elongate and said bottom opening is positioned medially within the stitch line and proximate to a lower end of the bib, therein also providing access to the deeper portion of the shallow cavity;

wherein the closeable neck ring has an adjustable fastener for comfortably fastening the bib onto a wearer's neck;

a second layer, which is an absorbent material fastened into an adjustable loop with a releasable fastening element, wherein the adjustable loop has an outer section that extends from the top opening to the bottom opening, and an inner section that extends through the deeper portion from the top opening to the bottom opening;

wherein when the outer section of the adjustable loop is soiled, a soiled length of the adjustable loop can be rotated into the deeper portion, and a comparable length of inner section of the adjustable loop that is unsoiled rotates out of the deeper portion, providing a refreshed unsoiled outer section of the adjustable loop on the front body portion of the bib.

2. The bib according to claim 1, wherein the absorbent material is washable and dryable using conventional appliances found in a home.

3. The bib according to claim 1, wherein the absorbent material is cotton, linen, terry cloth, or any absorbent material that can be cleaned by washing.

4. The bib according to claim 1, wherein the absorbent material is disposable, and nominally is selected from a group consisting cellulosic materials, maltodextrin, corn starch, acacia and combinations thereof.

5. The bib according to claim 1, wherein the adjustable loop is comprised of opposing ends of the second layer that are attached by the releasable fastening element.

6. The bib according to claim 1, wherein the adjustable fastener is comprised of hook and loop strips.

7. The bib according to claim 1, wherein the flap portions are connected with the adjustable fastener therein closing the closeable neck ring around the bib wearer's neck.

8. The bib according to claim 1, wherein the stitch line provides support for the top opening and the bottom opening.

9. The bib according to claim 1, wherein the bib has one or more designs, colors, and prints.

* * * * *